United States Patent
Wang et al.

(10) Patent No.: US 11,671,366 B1
(45) Date of Patent: Jun. 6, 2023

(54) APPARATUS, SYSTEM, AND METHOD FOR OPTIMIZING FORWARDING INFORMATION BASES ON NETWORK DEVICES

(71) Applicant: Juniper Networks, Inc., Sunnyvale, CA (US)

(72) Inventors: Kevin F. Wang, Sunnyvale, CA (US); Alex Varghese, Sunnyvale, CA (US); Swamy Sadashivaiah Renu Kananda, Sunnyvale, CA (US); Tamas B. Mondal, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 103 days.

(21) Appl. No.: 17/321,753

(22) Filed: May 17, 2021

(51) Int. Cl.
| | |
|---|---|
| *H04L 45/748* | (2022.01) |
| *H04L 45/42* | (2022.01) |
| *H04L 45/12* | (2022.01) |
| *H04L 45/02* | (2022.01) |

(52) U.S. Cl.
CPC ............ *H04L 45/748* (2013.01); *H04L 45/02* (2013.01); *H04L 45/123* (2013.01); *H04L 45/42* (2013.01)

(58) Field of Classification Search
CPC ..... H04L 45/748; H04L 45/02; H04L 45/123; H04L 45/42
See application file for complete search history.

(56) References Cited

U.S. PATENT DOCUMENTS

| | | | |
|---|---|---|---|
| 9,491,087 B1* | 11/2016 | Zhang | H04L 45/745 |
| 9,979,650 B1* | 5/2018 | Sheth | H04L 12/66 |
| 2015/0117459 A1* | 4/2015 | Liu | H04L 45/742 |
| | | | 370/392 |
| 2018/0278517 A1* | 9/2018 | Narayanan | H04L 45/48 |
| 2019/0173791 A1* | 6/2019 | Lim | H04L 45/74591 |
| 2019/0280969 A1* | 9/2019 | Liu | H04L 45/48 |

* cited by examiner

*Primary Examiner* — Chris Parry
*Assistant Examiner* — Dixon F Dabipi
(74) *Attorney, Agent, or Firm* — Greenberg Traurig, LLP

(57) ABSTRACT

A method may include (1) identifying a set of prefixes that (A) facilitate forwarding traffic within a network and (B) are organized as a tree data structure in connection with a table stored on a network device, (2) identifying, in the set of prefixes organized as the tree data structure, a parent prefix and a child prefix that corresponds to the parent prefix, (3) determining that the parent prefix and the child prefix share a certain number of most-significant bits in common with one another, (4) determining that the parent prefix and the child prefix share a forwarding behavior in common with one another and then, in response to determining that the parent prefix and the child prefix share the certain number of most-significant bits and the forwarding behavior in common with one another, (5) compressing the table stored on the network device by merging the child prefix with the parent prefix within the table. Various other apparatuses, systems, and methods are also disclosed.

19 Claims, 12 Drawing Sheets

Prefix Information 500

| PREFIX | BINARY CONVERSION | RELATIONSHIP | STATUS | NEXT HOP |
|---|---|---|---|---|
| 1.0.0.4/30 | 00000001.00000000.00000000.000001XX | Parent | Installed | Network Device 212(1) |
| 1.0.0.6/31 | 00000001.00000000.00000000.0000011X | Child | Uninstalled | Network Device 212(1) |
| 1.0.0.4/32 | 00000001.00000000.00000000.00000100 | Child | Uninstalled | Network Device 212(1) |
| 1.0.0.5/32 | 00000001.00000000.00000000.00000101 | Child | Uninstalled | Network Device 212(1) |
| 1.0.0.8/31 | 00000001.00000000.00000000.0000100X | Singleton | Installed | Network Device 210(1) |
| 1.0.0.10/32 | 00000001.00000000.00000000.00001100 | Singleton | Installed | Network Device 210(1) |
| 1.0.0.11/32 | 00000001.00000000.00000000.00001101 | Singleton | Installed | Network Device 210(1) |

*FIG. 5*

Prefix Information 1000 

| PREFIX | BINARY CONVERSION | RELATIONSHIP | STATUS | NEXT HOP |
|---|---|---|---|---|
| 1.0.0.4/30 | 00000001.00000000.00000000.000001XX | Parent | Installed | Network Device 212(1) |
| 1.0.0.6/31 | 00000001.00000000.00000000.0000011X | Child | Uninstalled | Network Device 212(1) |
| 1.0.0.4/31 | 00000001.00000000.00000000.0000010X | Child | Uninstalled | Network Device 212(1) |
| 1.0.0.4/32 | 00000001.00000000.00000000.00000100 | Child | Uninstalled | Network Device 212(1) |
| 1.0.0.5/32 | 00000001.00000000.00000000.00000101 | Child | Uninstalled | Network Device 212(1) |
| 1.0.0.8/30 | 00000001.00000000.00000000.000010XX | Parent | Installed | Network Device 210(1) |
| 1.0.0.8/31 | 00000001.00000000.00000000.0000100X | Child | Uninstalled | Network Device 210(1) |
| 1.0.0.10/31 | 00000001.00000000.00000000.0000101X | Child | Uninstalled | Network Device 210(1) |
| 1.0.0.10/32 | 00000001.00000000.00000000.00001010 | Child | Uninstalled | Network Device 210(1) |
| 1.0.0.11/32 | 00000001.00000000.00000000.00001011 | Child | Uninstalled | Network Device 210(1) |

*FIG. 10*

APPARATUS, SYSTEM, AND METHOD FOR OPTIMIZING FORWARDING INFORMATION BASES ON NETWORK DEVICES

BACKGROUND

The Internet is built on and/or supported by network devices (such as routers) that facilitate the flow of traffic from one end-point to another. The current size of the Internet may include and/or involve approximately 800,000 Internet Protocol version 4 (IPv4) routes and approximately 35,000 Internet Protocol version 6 (IPv6) routes. A typical Internet router may include and/or store around 1,000,000 IPv4 routes and between 100,000 and 200,000 IPv6 routes. Due to their longer prefix lengths, IPv6 routes may consume 4 times as much space as IPv4 routes.

In some examples, network devices may store and/or install these IPv4 and IPv6 routes in expensive Forwarding Information Bases (FIBs). Such network devices may also store and/or install other routes like Multiprotocol Label Switching (MPLS) routes and/or multicast routes in the expensive FIBs. Upon installation of such routes, these network devices may have very little capacity remaining in their FIBs. Nevertheless, the size of the Internet may continue growing at a rate of approximately 10% per year. Accordingly, the FIBs of these network devices may soon be unable to store and/or install the full collection of routes that facilitate access to the Internet without further optimization. The instant disclosure, therefore, identifies and addresses a need for improved apparatuses, systems, and methods for optimizing FIBs on network devices.

SUMMARY

As will be described in greater detail below, the instant disclosure generally relates to apparatuses, systems, and methods for optimizing FIBs on network devices. In one example, a method for accomplishing such a task may include (1) identifying a set of prefixes that (A) facilitate forwarding traffic within a network and (B) are organized as a tree data structure in connection with a table stored on a network device, (2) identifying, in the set of prefixes organized as the tree data structure, a parent prefix and a child prefix that corresponds to the parent prefix, (3) determining that the parent prefix and the child prefix share a certain number of most-significant bits in common with one another, (4) determining that the parent prefix and the child prefix share a forwarding behavior in common with one another and then, in response to determining that the parent prefix and the child prefix share the certain number of most-significant bits and the forwarding behavior in common with one another, (5) compressing the table stored on the network device by merging the child prefix with the parent prefix within the table.

Similarly, a system that implements the above-identified method may include a physical processor configured to execute various modules stored in memory on a network device within a network. In one example, this system may include and/or execute (1) an identification module that (A) identifies a set of prefixes that (I) facilitate forwarding traffic within a network and (II) are organized as a tree data structure in connection with a table stored on a network device and (B) identifies, in the set of prefixes organized as the tree data structure, a parent prefix and a child prefix that corresponds to the parent prefix, (2) a determination module that (A) determines that the parent prefix and the child prefix share a certain number of most-significant bits in common with one another and (B) determines that the parent prefix and the child prefix share a forwarding behavior in common with one another, and (3) a compression module that compresses the table stored on the network device by merging the child prefix with the parent prefix within the table due at least in part to the parent prefix and the child prefix sharing the certain number of most-significant bits and the forwarding behavior in common with one another.

Additionally or alternatively, an apparatus that implements the above-identified method may include at least one storage device that stores a set of prefixes that (1) facilitate forwarding traffic within a network and (2) are organized as a tree data structure in connection with a table stored on a network device. The apparatus may also include at least one physical processor communicatively coupled to the storage device. In one example, the physical processor may (1) identifies, in the set of prefixes organized as the tree data structure, a parent prefix and a child prefix that corresponds to the parent prefix, (2) determines that the parent prefix and the child prefix share a certain number of most-significant bits in common with one another, (3) determines that the parent prefix and the child prefix share a forwarding behavior in common with one another, and then (4) compresses the table stored on the network device by merging the child prefix with the parent prefix within the table in response to determining that the parent prefix and the child prefix share the certain number of most-significant bits and the forwarding behavior in common with one another.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a table of exemplary prefix information corresponding to the tree structure illustrated in FIG. 4.

FIG. 10 is a table of additional exemplary prefix information corresponding to the tree structures illustrated in FIGS. 6-9.

Figure 1:
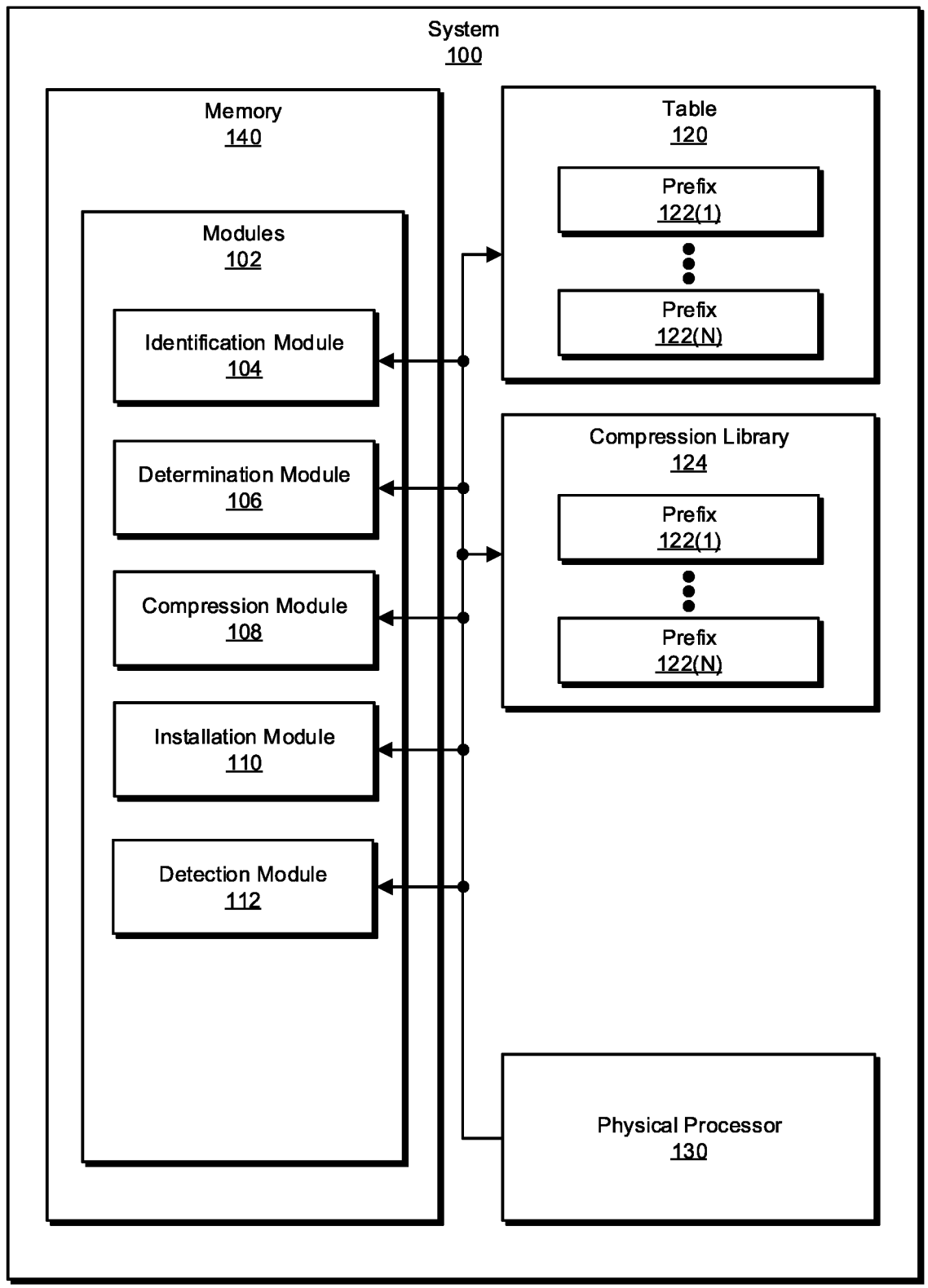
FIG. 1 is a block diagram of an exemplary system for optimizing FIBs on network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for optimizing FIBs on network devices. As will be explained in greater detail below, embodiments of the instant disclosure may involve compressing FIBs of network devices by merging eligible child prefixes with their corresponding parent prefixes within those FIBs. For example, a router may identify a child prefix corresponding to a parent prefix installed on a FIB of the router. In this example, if the parent prefix and the child prefix share a certain number of most-significant bits in common and share a certain forwarding behavior in common, then the router may merge the child prefix with the parent prefix within the FIB. This merger may involve refusing to install the child prefix in the FIB and/or deleting the child prefix from the FIB.

The router may repeat such mergers for each eligible child prefix to compress the FIB. By compressing the FIB in this way, the router may be able to optimize the capacity and/or space in the FIB. In some examples, this optimization may effectively double the storage capacity of the FIB on the router.

The following will provide, with reference to FIGS. 1-10 detailed descriptions of exemplary apparatuses, systems, components, and corresponding implementations for optimizing FIBs on network devices. Detailed descriptions of computer-implemented methods for optimizing FIBs on network devices will be provided in connection with FIG. 11. In addition, detailed descriptions of an exemplary computing system for carrying out these methods will be provided in connection with FIG. 12.

FIG. 1 shows an exemplary system 100 that facilitates optimizing FIBs on network devices. As illustrated in FIG. 1, system 100 may include one or more modules 102 for performing one or more tasks. As will be explained in greater detail below, modules 102 may include an identification module 104, a determination module 106, a compression module 108, an installation module 110, and a detection module 112. Although illustrated as separate elements, one or more of modules 102 in FIG. 1 may represent portions of a single module, application, and/or operating system. For example, one or more of modules 102 may represent part of and/or be included in a table-compression application that simulates a table (such as a FIB) stored on a network device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network devices 202, 206, 208, 210(1)-(N), and/or 212(1)-(N)), the devices illustrated in FIG. 3 (e.g., routing engine 310, packet forwarding engine 312, etc.), and/or the devices illustrated in FIG. 12 (e.g., computing system 1200). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate optimizing FIBs on network devices. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more tables, such as table 120. In some examples, table 120 may include and/or represent a FIB and/or a Routing Information Base (RIB). In one example, table 120 may include and/or represent a set of prefixes 122(1)-(N) organized as a tree data structure in a FIB, a RIB, and/or a simulator. In this example, prefixes 122(1)-(N) within table 120 may include and/or represent a copy of prefixes that are duplicated elsewhere on a network device. Additionally or alternatively, prefixes 122(1)-(N) may constitute and/or represent routes, data, and/or information that identify or refer to a portion of a network, network device, and/or network interface.

In one example, prefixes 122(1)-(N) may each identify and/or represent a path capable of carrying traffic within a network and/or across networks. Additionally or alternatively, prefixes 122(1)-(N) may include and/or contain data representations of and/or references to one or more physical devices or interfaces (such an "ifd"), logical devices or interfaces (such as an "ifl"), next hops, and/or path segments. Examples of prefixes 122(1)-(N) include, without limitation, Internet Protocol (IP) prefixes (such as IPv4 and/or IPv6 prefixes), Multiprotocol Label Switching (MPLS) prefixes, Virtual Private Local Area Network Service (VLAN) prefixes, Border Gateway Protocol (BGP) prefixes, Open Shortest Path First (OSPF) prefixes, variations or combinations of one or more of the same, and/or any other suitable prefixes.

In some examples, prefixes 122(1)-(N) may include and/or represent a collection of parent prefixes and/or child prefixes. In one example, a parent prefix may include and/or represent a string of bits that define a network path. In this example, a child prefix corresponding to the parent prefix may include and/or represent a certain number of most-significant bits that match the parent prefix in addition to one or more least significant bits. Accordingly, the child prefix may be longer than the parent prefix and may include the same string of bits as the parent prefix in the left-most section as well as one or more additional bits in the right-most section.

As illustrated in FIG. 1, exemplary system 100 may additionally include one or more compression libraries, such as compression library 124. In some examples, compression library 124 may represent part of and/or be included in a table-compression application that simulates a FIB and/or RIB stored on a network device. In one example, compression library 124 may include and/or represent another copy of prefixes 122(1)-(N). In this example, the simulation may enable the table-compression application to determine whether certain child prefixes stored in the FIB and/or RIB are eligible for merger with their corresponding parents without necessarily examining, reading from, and/or writing to the FIB and/or RIB itself.

Figure 2:
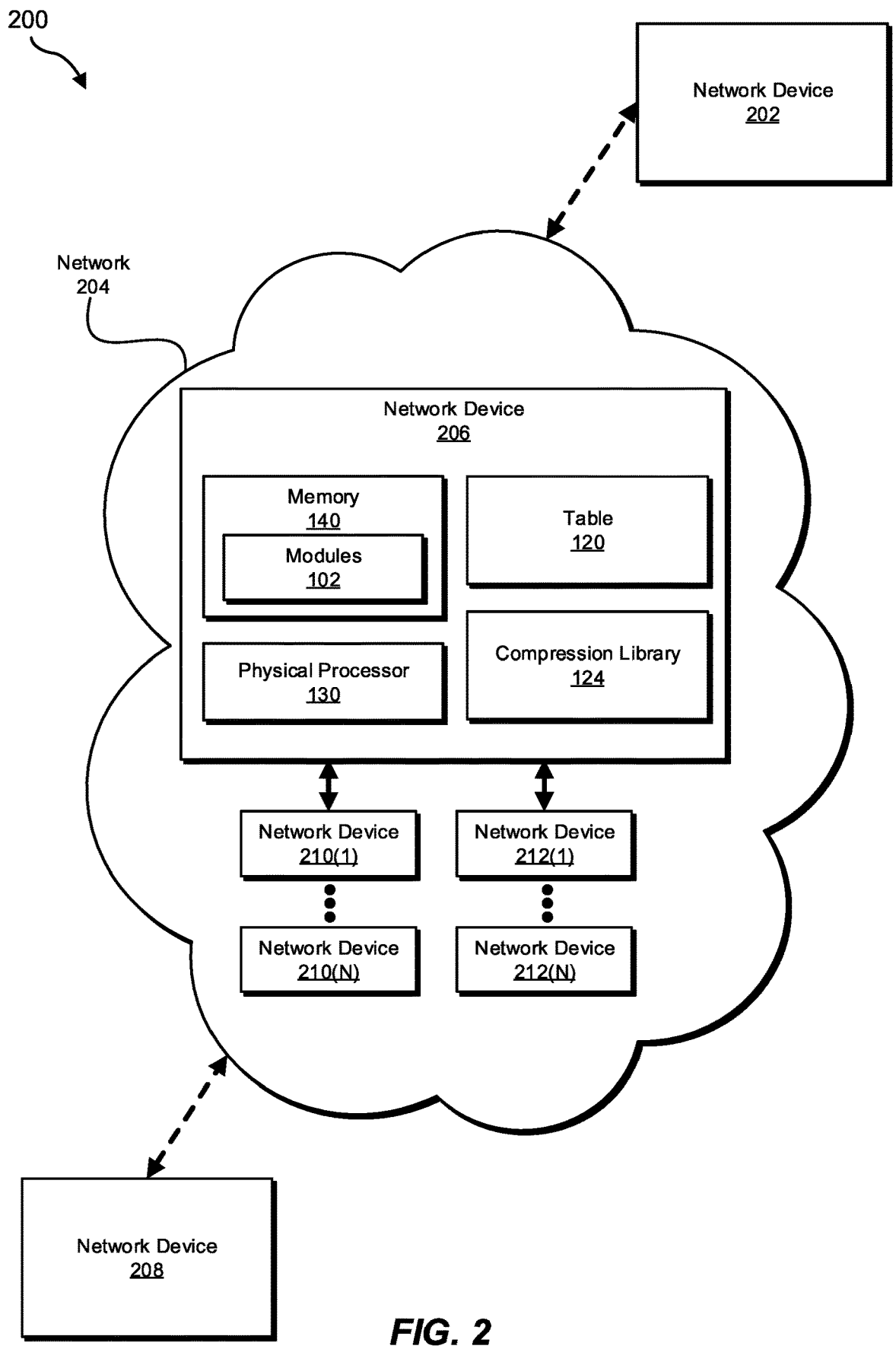
FIG. 2 is a block diagram of an additional exemplary system for optimizing FIBs on network devices.

An apparatus for optimizing FIBs on network devices may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among network device 206, network devices 210(1)-(N), network devices 212(1)-(N), network device 202, and/or network device 208.

As illustrated in FIG. 2, network 204 may include and/or represent various network devices and/or nodes that form and/or establish communication paths and/or segments. For example, network 204 may include a network device 206 that forwards traffic from network device 202 along one or more active paths toward network device 208. In this example, an active path may include and/or represent network devices 210(1)-(N), and another active path may include and/or represent network devices 212(1)-(N).

In some embodiments, each of network devices 202, 206, 208, 210(1)-(N), and/or 212(1)-(N) may include and/or represent an instance of memory 140, an instance of physical processor 130, an instance of table 120, and/or an instance of compression library 124. In one example, and as will be described in greater detail below, one or more of modules 102 may cause network device 206 to (1) identify a set of prefixes 122(1)-(N) that (A) facilitate forwarding traffic within network 204 and (B) are organized as a tree data structure in connection with table 120 stored on network device 206, (2) identify, in the set of prefixes 122(1)-(N) organized as the tree data structure, a child prefix that corresponds to a parent prefix, (3) determine that the parent prefix and the child prefix share a certain number of most-significant bits in common with one another, (4) determine that the parent prefix and the child prefix share a forwarding behavior in common with one another and then, in response to determining that the parent prefix and the child prefix share the certain number of most-significant bits and the forwarding behavior in common with one another, (5) compress table 120 stored on network device 206 by merging the child prefix with the parent prefix within table 120.

Network devices 202, 206, 208, 210(1)-(N), and/or 212(1)-(N) each generally represent any type or form of physical computing device capable of reading computer-executable instructions, handling network traffic, and/or optimizing FIBs. In one example, network devices 202, 206, 208, 210(1)-(N), and/or 212(1)-(N) may each include and/or represent a router (such as a transit label switching router, a label edge router, a provider edge router, a hub router, a spoke router, an autonomous system boundary router, and/or an area border router). Additional examples of network devices 202, 206, 208, 210(1)-(N), and/or 212(1)-(N) include, without limitation, switches, hubs, modems, bridges, repeaters, gateways (such as Broadband Network Gateways (BNGs)), multiplexers, network adapters, network interfaces, linecards, collectors, client devices, laptops, tablets, desktops, servers, cellular phones, Personal Digital Assistants (PDAs), multimedia players, embedded systems, wearable devices, gaming consoles, portions of one or more of the same, variations or combinations of one or more of the same, and/or any other suitable devices.

Network 204 generally represents any medium and/or architecture capable of facilitating communication, data transfer, and/or route changes. In one example, network 204 may include any or all of network devices 202, 206, 208, 210(1)-(N), and/or 212(1)-(N) even though some of these devices are illustrated as being external to network 204 in FIG. 2. Additionally or alternatively, network 204 may include other devices that facilitate communication among network devices 202, 206, 208, 210(1)-(N), and/or 212(1)-(N). Network 204 may facilitate communication or data transfer using wireless and/or wired connections. Examples of network 204 include, without limitation, an intranet, an access network, a layer 2 network, a layer 3 network, an MPLS network, an IP network, a heterogeneous network (e.g., layer 2, layer 3, IP, and/or MPLS network), a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 11:
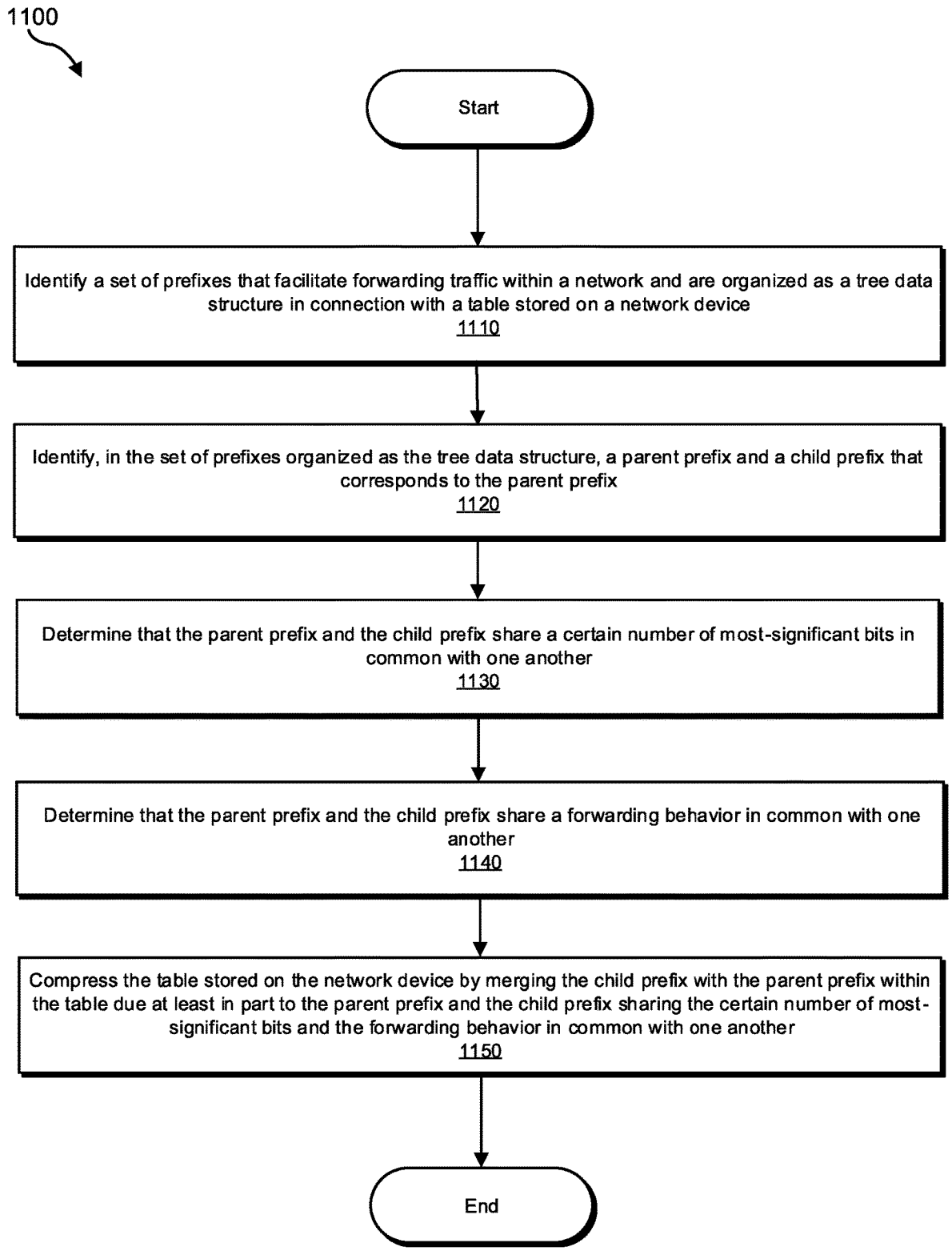
FIG. 11 is a flow diagram of an exemplary method for optimizing FIBs on network devices.

FIG. 11 is a flow diagram of an exemplary computer-implemented method 1100 for optimizing FIBs on network devices. The steps shown in FIG. 11 may be performed by any suitable computer-executable code and/or computing system, including system 100 in FIG. 1, system 200 in FIG. 2, network device 206 in FIG. 3, system 1200 in FIG. 12, and/or variations or combinations of one or more of the same. In addition, the steps shown in FIG. 11 may be performed by any suitable node, device, and/or component included in system 100 in FIG. 1, system 200 in FIG. 2, network device 206 in FIG. 3, system 1200 in FIG. 12, and/or the like. In one example, each of the steps shown in FIG. 10 may represent an algorithm whose structure includes and/or is represented by multiple sub-steps, examples of which will be provided in greater detail below.

As illustrated in FIG. 11, at step 1110 one or more of the systems described herein may identify a set of prefixes that facilitate forwarding traffic within a network and are organized as a tree data structure in connection with a table stored on a network device. For example, identification module 104 may, as part of network device 206 in FIG. 2, identify a set of prefixes 122(1)-(N) that facilitate forwarding traffic within network 204. In this example, set of prefixes 122(1)-(N) may be organized as a tree data structure (such as a radix tree) in connection with table 120. In some examples, table 120 may include and/or represent a FIB stored and/or implemented on a packet forwarding engine of network device 206. Additionally or alternatively, table 120 may include and/or represent a RIB stored and/or implemented on a routing engine of network device 206.

In some examples, the packet forwarding engine and/or routing engine may constitute and/or represent a hardware component or device incorporated into network device 206. For example, the packet forwarding engine may include and/or represent an ASIC, a System on a Chip (SoC), a general-purpose processor, and/or any other suitable processing element. Additionally or alternatively, the routing engine may include and/or represent an ASIC, an SoC, a general-purpose processor, and/or any other suitable processing element.

The systems described herein may perform step 1110 in a variety of ways and/or contexts. In some examples, identification module 104 may represent part of and/or be included in a table-compression application implemented by network device 206 to simulate table 120 stored on network device 206. In one example, the table-compression application may be implemented on and/or via the packet forwarding engine of network device 206. In another example, the table-compression application may be implemented on and/or via the routing engine of network device 206.

In one example, the table-compression application may maintain and/or access compression library 124 that includes a copy of prefixes 122(1)-(N) and/or reflects the current state of table 120. In this example, installation module 110 may install that copy of prefixes 122(1)-(N) in table 120 and/or compression library 124.

In some examples, installation module 110 may maintain prefixes 122(1)-(N) as part of the table-compression application that simulates and/or emulates table 120. For example, installation module 110 may duplicate route changes across table 120 and/or compression library 124 as such route changes reach and/or affect network device 206. In this example, installation module 110 may detect a route change to be performed on the copy of prefixes stored in table 120. Installation module 110 may then propagate the route change to the copy of prefixes maintained as part of the table-compression application. Such detection and/or propagation of route changes may be performed inline and/or in-band as those route changes reach and/or arrive at network device 206.

In some examples, identification module 104 may search compression library 124 for a copy of the prefixes currently installed in the FIB of network device 206. During this search of compression library 124, identification module 104 may identify and/or locate a copy of prefixes 122(1)-(N), which are organized as a tree data structure and collectively represent the current state of the FIB of network device 206. In other examples, identification module 104 may search the FIB of network device 206 for the prefixes currently installed. During the search of the FIB, identification module 104 may identify and/or locate a copy of prefixes 122(1)-(N) that are organized as a tree data structure. In further examples, identification module 104 may search the RIB of network device 206 for the prefixes currently installed. During the search of the RIB, identification module 104 may identify and/or locate a copy of prefixes 122(1)-(N), which are organized as a tree data structure and reflect the current state of the FIB of network device 206.

As illustrated in FIG. 11, at step 1120 one or more of the systems described herein may identify, in the set of prefixes organized as the tree data structure, a parent prefix and a child prefix that corresponds to the parent prefix. For example, identification module 104 may, as part of network device 206 in FIG. 2, identify a prefix 122(1) as being a parent to prefix 122(N). In this example, as the child, prefix 122(N) may be longer than prefix 122(1). Specifically, prefix 122(1) may constitute and/or represent a subset of prefix 122(N) positioned in the most-significant and/or left-most region of prefix 122(N).

The systems described herein may perform step 1120 in a variety of ways and/or contexts. In one example, identification module 104 may identify prefix 122(1) as a node within the tree data structure. In this example, identification module 104 may walk through the tree data structure from prefix 122(1) to prefix 122(N). Upon arriving at prefix 122(N), identification module 104 may identify prefix 122(N) as another node within the tree data structure. In view of these observations and/or discoveries during the tree walk, identification module 104 may identify prefix 122(N) as being a child to prefix 122(1).

In some examples, prefixes 122(1) and 122(N) may be linked to one another within the tree data structure. For example, prefixes 122(1) and 122(N) may be positioned and/or located within the same branch of the tree data structure. In this example, prefix 122(1) may be positioned and/or located above prefix 122(N) toward the root node of the tree data structure. Accordingly, prefix 122(N) may be positioned and/or located below prefix 122(1) along the branch of the tree data structure.

As illustrated in FIG. 11, at step 1130 one or more of the systems described herein may determine that the parent prefix and the child prefix share a certain number of most-significant bits in common with one another. For example, determination module 106 may, as part of network device 206 in FIG. 2, determine that prefixes 122(1) and 122(N) share a certain number of most-significant bits in common with one another. In one example, the number of most-significant bits in question may correspond to and/or match the length of the parent prefix (e.g., prefix 122(1)).

The systems described herein may perform step 1130 in a variety of ways and/or contexts. In some examples, determination module 106 may determine and/or discover a length of or number of bits in prefix 122(1). In such examples, determination module 106 may compare prefix 122(1) to the most-significant bits in prefix 122(N). In one example, determination module 106 may then determine that prefixes 122(1) and 122(N) share a certain number of most-significant bits in common with one another based at least in part on the comparison.

As a specific example, prefix 122(1) may represent a prefix "1.0.0.4/30", and prefix 122(N) may represent a prefix "1.0.0.6/31". Converted to binary, prefix "1.0.0.4/30" may correspond to a binary representation "00000001.00000000.00000000.000001XX", and prefix "1.0.0.6/31" may correspond to a binary representation "00000001.00000000.00000000.0000011X". In this example, identification module 104 and/or determination module 106 may compare binary representation "00000001.00000000.00000000.000001XX" to binary representation "00000001.00000000.00000000.0000011X". Identification module 104 and/or determination module 106 may then determine that the 30 most-significant bits of those prefixes are identical to one another based at least in part on the comparison.

As illustrated in FIG. 11, at step 1140 one or more of the systems described herein may determine that the parent prefix and the child prefix share a forwarding behavior in common with one another. For example, determination module 106 may, as part of network device 206 in FIG. 2, determine that prefixes 122(1) and 122(N) share a forwarding behavior in common with one another. In this example, the forwarding behavior in question may direct network device 206 to forward traffic to a specific next hop. Accordingly, prefixes 122(1) and 122(N) may both cause network device 206 to forward traffic to the same next hop. However, other prefixes with a parent-child relationship may cause network device 206 to forward traffic to different next hops. In other words, not all child prefixes may necessarily lead to the same next hop as their corresponding parent prefixes.

The systems described herein may perform step 1140 in a variety of ways and/or contexts. In some examples, determination module 106 may determine whether prefixes 122(1) and 122(N) lead to the same next hop as one another. For example, identification module 104 may search and/or examine the routes corresponding to prefixes 122(1) and 122(N) for addresses (e.g., the IP addresses) assigned to their respective next hops. In this example, during this search and/or examination, identification module 104 may identify and/or locate the next-hop addresses of those routes and then compare the next-hop addresses with one another. In one example, determination module 106 may determine that the next-hop addresses identified within the routes corresponding to prefixes 122(1) and 122(N) are identical to one another. As a result, determination module 106 may determine that prefixes 122(1) and 122(N) both cause network device 206 to forward traffic to the same next hop and thus have the same forwarding behavior.

In another example, identification module 104 may search and/or examine the routes corresponding to prefixes 122(1) and 122(N) for outgoing interfaces through which traffic is to egress. In this example, during this search and/or examination, identification module 104 may identify and/or locate the outgoing interfaces of those routes and then compare the outgoing interfaces addresses with one another. In one example, determination module 106 may determine that the outgoing interfaces identified within the routes corresponding to prefixes 122(1) and 122(N) are identical to one another. As a result, determination module 106 may determine that prefixes 122(1) and 122(N) both cause network device 206 to forward traffic to the same next hop and thus have the same forwarding behavior.

As illustrated in FIG. 11, at step 1150 one or more of the systems described herein may compress the table stored on the network device by merging the child prefix with the parent prefix within the table in response to the determination that the parent prefix and the child prefix share the certain number of most-significant bits and the forwarding behavior in common. For example, compression module 108 may, as part of network device 206 in FIG. 2, compress table 120 stored on network device 206 by merging prefix 122(N) with prefix 122(1) within table 120. Accordingly, prefixes 122(1) and 122(N) may be consolidated into one node that applies to all traffic corresponding to those prefixes, thereby reducing the amount of space needed and/or consumed in table 120 to accommodate such traffic. Compression module 108 may initiate the compression and/or merger in response to the determination that prefixes 122(1) and 122(N) share the certain number of most-significant bits and the forwarding behavior in common with one another.

The systems described herein may perform step 1150 in a variety of ways and/or contexts. In some examples, compression module 108 may refuse to install prefix 122(N) in table 120 stored on network device 206. For example, a route change may arrive at network device 206, and determination module 106 may determine that the route change involves a certain prefix. Specifically, determination module 106 may determine that the prefix involved in the route change shares a certain number of most-significant bits with another prefix to which the prefix would be adjacent within table 120. In addition, determination module 106 may determine that the prefix involved in the route change shares a certain forwarding behavior with the other prefix to which the prefix would be adjacent within table 120. In response to the determination that these prefixes share the certain number of most-significant bits and the certain forwarding behavior in common with one another, compression module 108 may refuse to install the prefix involved in the route change within table 120 stored on network device 206, thereby conserving space within table 120.

Figure 3:
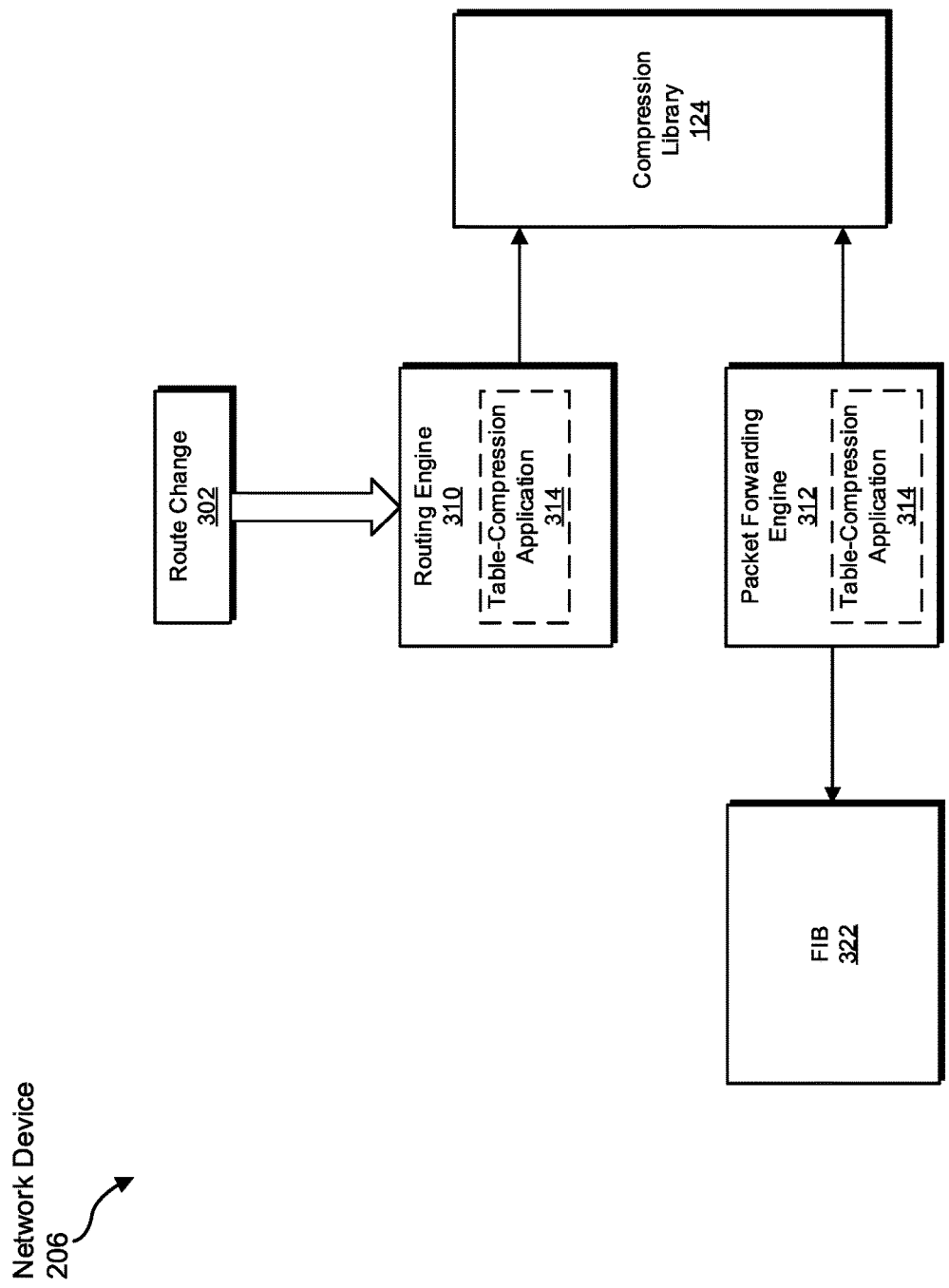
FIG. 3 is a block diagram of an exemplary network device capable of optimizing its FIB.

FIG. 3 illustrates an exemplary implementation of network device 206. In one example, a route change 302 may arrive at network device 206. In this example, network device 206 may include and/or represent a routing engine 310 and a packet forwarding engine 312. Network device 206 may instantiate and/or implement a table-compression application 314 in routing engine 310 and/or packet forwarding engine 312. Table-compression application 314 may simulate table 120 stored on network device 206 via compression library 124.

In one example, table-compression application 314 may analyze route change 302 via compression library 124. In this example, table-compression application 314 may determine that at least one prefix involved in route change 302 is eligible for compression and/or merger with a would-be parent prefix in table 120 based at least in part on this analysis. In response to this determination, table-compression application 314 may refuse to install the prefix involved in route change 302 within table 120 due at least in part to the parent prefix already being installed in table 120.

In some examples, compression module 108 may delete prefix 122(N) from table 120 stored on network device 206. For example, identification module 104 may walk the tree data structure in search of any child prefixes that are eligible for merger with corresponding parent prefixes within table 120. In this example, the identification module 104 may identify a child prefix installed beneath a parent prefix within table 120. Determination module 106 may then determine that the child prefix and the parent prefix share a certain number of most-significant bits in common with one another. In addition, determination module 106 may determine that the child prefix and the parent prefix share a certain forwarding behavior in common with one another. In response to the determination that these prefixes share the certain number of most-significant bits and the certain forwarding behavior in common with one another, compression module 108 may delete the child prefix from table 120, thereby consolidating the child prefix with the parent prefix to reduce the amount of space needed to accommodate traffic with the same next hop.

Figure 4:
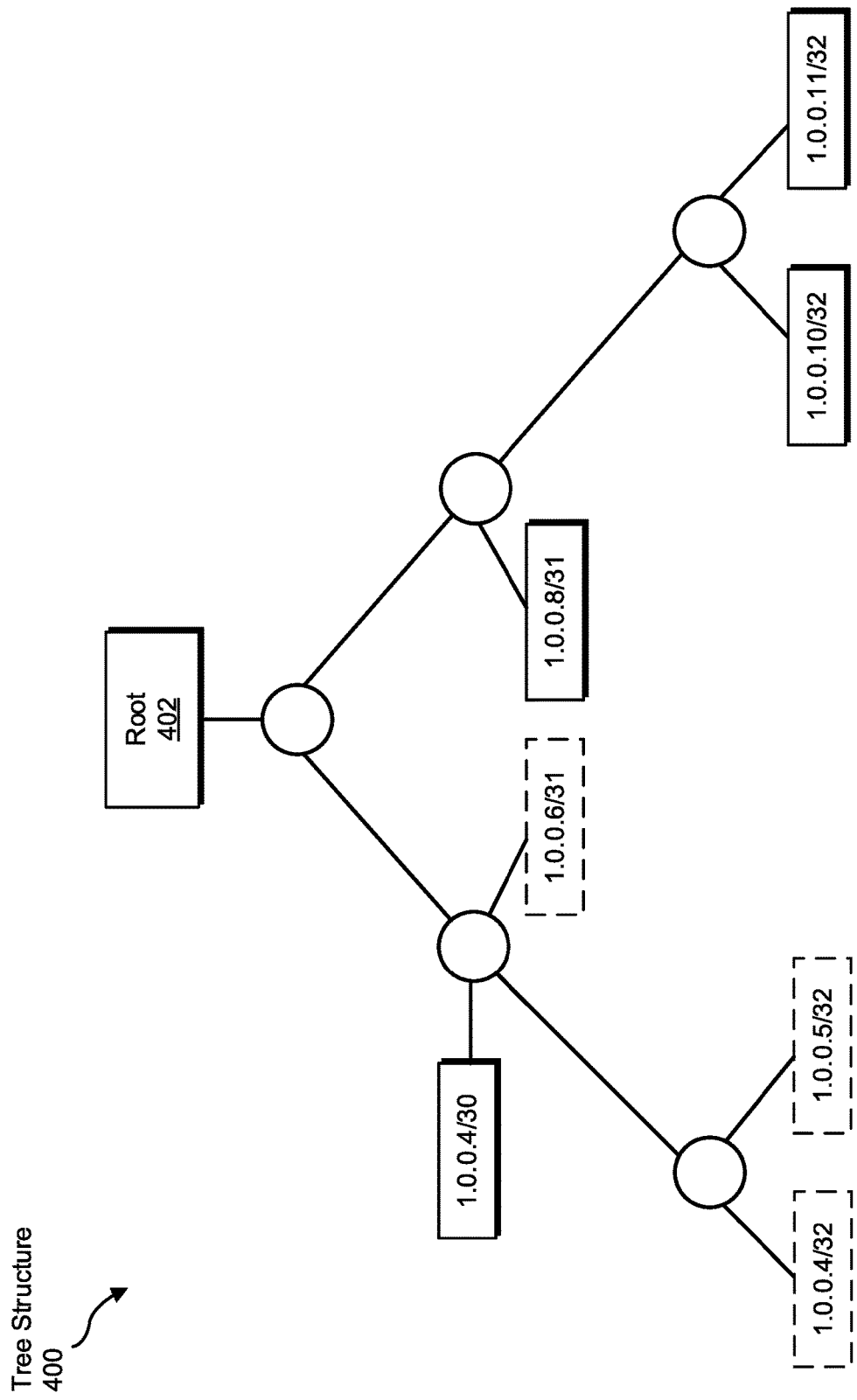
FIG. 4 is a block diagram of an exemplary tree structure in which a set of prefixes are organized on a network device.
Figure 6:
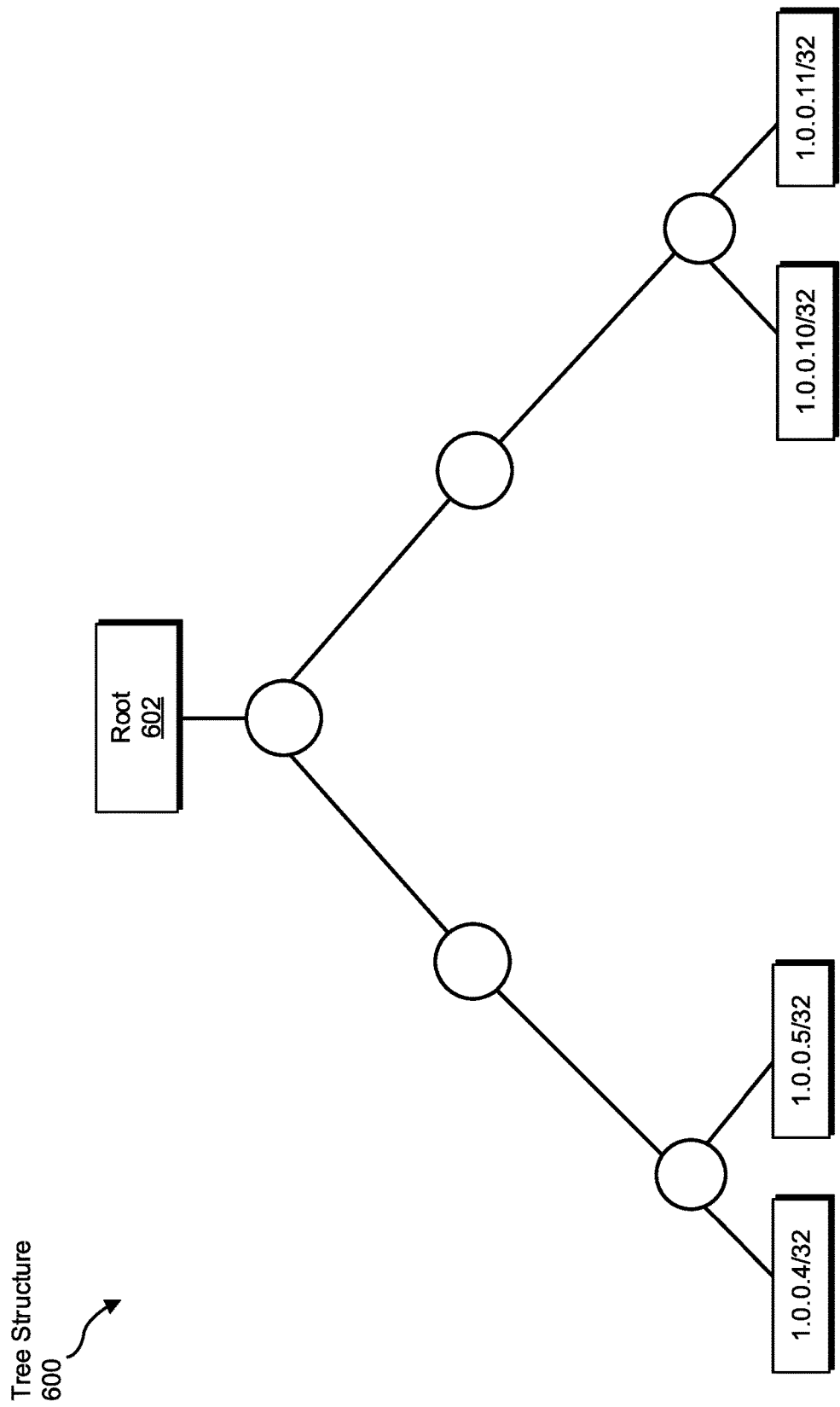
FIG. 6 is a block diagram of an additional exemplary tree structure in which a set of prefixes are organized on a network device.

FIG. 4 illustrates an exemplary tree structure 400 in which prefixes 122(1)-(N) are organized within table 120. As illustrated in FIG. 4, tree structure 400 may include and/or represent a root 402 that branches into different hierarchies of prefixes. In one example, tree structure 400 may include and/or represent one branch that incorporates a parent prefix "1.0.0.4/30". In this example, the parent prefix "1.0.0.4/30" may subsume and/or absorb child prefixes "1.0.0.6/31", "1.0.0.4/32", and/or "1.0.0.5/32". Accordingly, child prefixes "1.0.0.6/31", "1.0.0.4/32", and/or "1.0.0.5/32" may be properly represented by parent prefix "1.0.0.4/30" within table 120 for the purpose of forwarding traffic to the same next hop.

Continuing with this example, tree structure 400 may include and/or represent another branch that incorporates a singleton prefix "1.0.0.8/31". In this example, singleton prefix "1.0.0.8/31" may be neither a parent nor a child. For example, singleton prefix "1.0.0.8/31" may not be a parent to either singleton prefix "1.0.0.10/32" or singleton prefix "1.0.0.11/32". Conversely, neither singleton prefix "1.0.0.10/32" nor singleton prefix "1.0.0.11/32" may be a child to singleton prefix "1.0.0.8/31". As a result, singleton prefix "1.0.0.8/31" may be unable to subsume and/or absorb singleton prefixes "1.0.0.10/32" and/or "1.0.0.11/32". Accordingly, singleton prefixes "1.0.0.10/32" and/or "1.0.0.11/32" may not be properly represented by singleton prefix "1.0.0.8/31" within table 120 for the purpose of forwarding traffic to the same next hop.

FIG. 5 illustrates exemplary prefix information 500 that identifies and/or enumerates the binary conversions, relationships, statuses, and next hops for the prefixes represented in tree structure 400 in FIG. 4. As illustrated in FIG. 5, prefix information 500 may indicate and/or show that prefix "1.0.0.4/30" is an installed parent whose binary conversion is "00000001.00000000.00000000.000001XX" and whose next hop is network device 212(1). In addition, prefix information 500 may indicate and/or show that prefix "1.0.0.6/31" is an uninstalled child whose binary conversion is "00000001.00000000.00000000.0000011X" and whose next hop is network device 212(1). Moreover, prefix information 500 may indicate and/or show that prefix "1.0.0.4/32" is an uninstalled child whose binary conversion is "00000001.00000000.00000000.00000100" and whose next hop is network device 212(1). Further, prefix information 500 may indicate and/or show that prefix "1.0.0.5/32" is an uninstalled child whose binary conversion is "00000001.00000000.00000000.00000101" and whose next hop is network device 212(1).

As illustrated in FIG. 5, prefix information 500 may also indicate and/or show that prefix "1.0.0.8/31" is an installed singleton whose binary conversion is "00000001.00000000.00000000.0000100X" and whose next hop is network device 210(1). In addition, prefix information 500 may indicate and/or show that prefix "1.0.0.10/32" is an installed singleton whose binary conversion is "00000001.00000000.00000000.00001100" and whose next hop is network device 210(1). Further, prefix information 500 may indicate and/or show that prefix "1.0.0.11/32" is an installed singleton whose binary conversion is "00000001.00000000.00000000.00001101" and whose next hop is network device 210(1).

In some examples, identification module 104 may walk the tree data structure and/or identify a set of prefixes that share one or more characteristics in common with one another. In one example, determination module 106 may determine that the set of prefixes are eligible for consolidation due at least in part to the characteristics being shared by those prefixes. In response to this determination, installation module 110 may install a parent prefix that serves as an aggregator for the set of prefixes to handle traffic directed to any of them. In this example, compression module 108 and/or installation module 110 may merge the set of prefixes with the parent prefix by deleting the set of prefixes from table 120 upon installation of the parent prefix.

In some examples, identification module 104 may identify a further child prefix that corresponds to the aggregator parent prefix. In one example, identification module 104 may identify an additional characteristic shared by the aggregator parent prefix and the further child prefix. Additionally or alternatively, determination module 106 may determine that the aggregator parent prefix and the further child prefix may share the original one or more characteristics in common with one another. Either way, determination module 106 may determine that the aggregator parent prefix and the further child prefix are eligible for further consolidation due at least in part to the additional characteristic and/or the original characteristics being shared by those prefixes. In response to this determination, installation module 110 may install an additional parent prefix that serves as an additional aggregator for the original aggregator parent prefix and the further child prefix to handle corresponding traffic. In this example, compression module 108 and/or installation module 110 may merge the original aggregator parent prefix and the further child prefix by deleting the original aggregator parent prefix and the further child prefix from table 120 upon installation of the additional parent prefix.

FIGS. 6-9 illustrates an exemplary tree structure 600 in which prefixes 122(1)-(N) are organized within table 120. As illustrated in FIGS. 6-9, tree structure 600 may include and/or represent a root 602 that branches into different subsets of prefixes. In one example, tree structure 600 in FIG. 6 may include and/or represent one branch that incorporates prefixes "1.0.0.4/32" and/or "1.0.0.5/32". In this example, tree structure 600 in FIG. 6 may include and/or represent another branch that incorporates prefixes "1.0.0.10/32" and/or "1.0.0.11/32".

Figure 7:
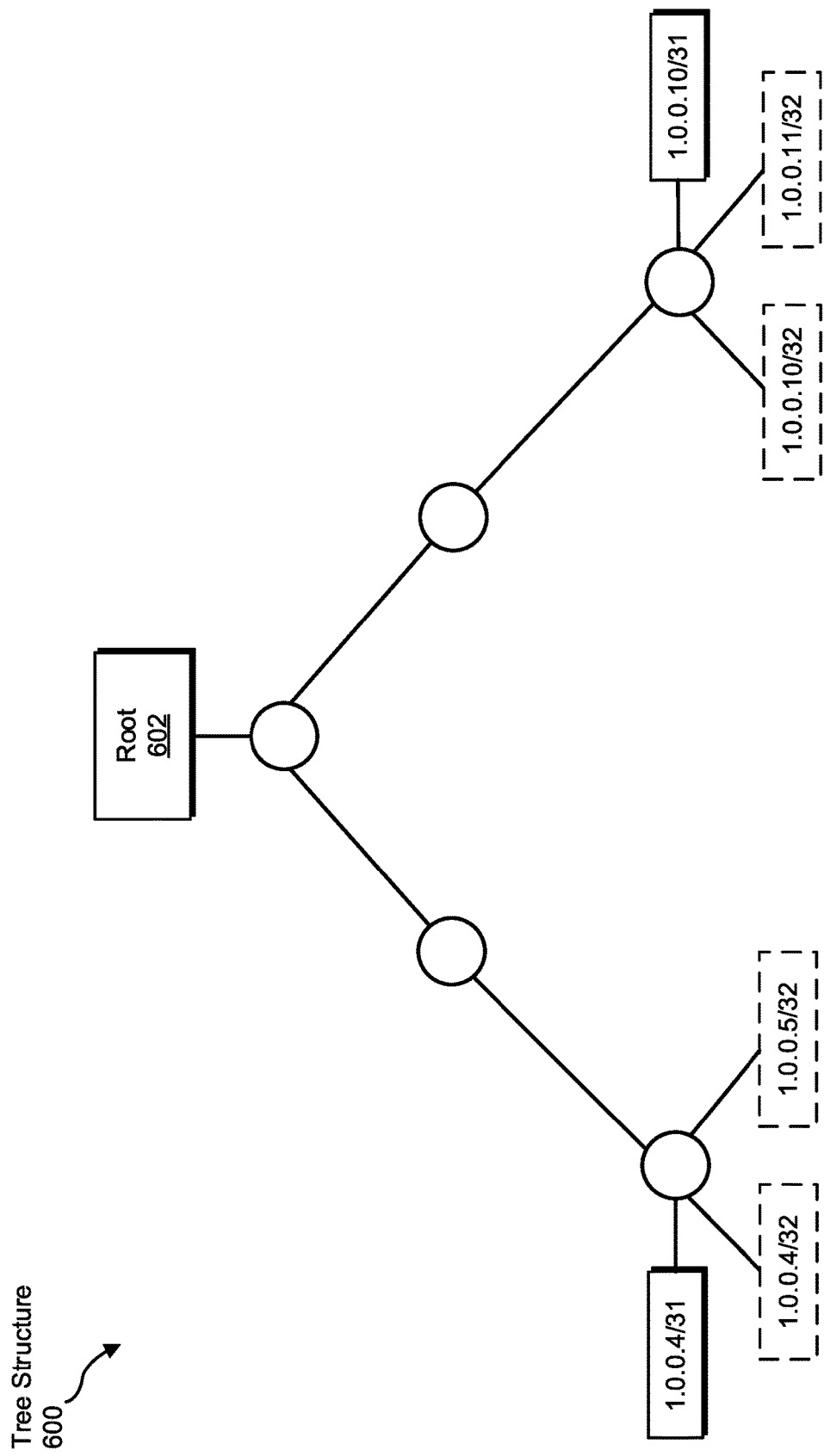
FIG. 7 is a block diagram of an additional exemplary tree structure in which a set of prefixes are organized on a network device.

As a specific example, identification module 104 may walk tree structure 600 along one branch and/or identify prefixes "1.0.0.4/32" and "1.0.0.5/32" as sharing the 31 most-significant bits in common with one another. In this example, determination module 106 may determine that prefixes "1.0.0.4/32" and "1.0.0.5/32" are eligible for consolidation due at least in part to them sharing the 31 most-significant bits in common with one another. In response to this determination, installation module 110 may install a parent prefix "1.0.0.4/31" into tree structure 600 in FIG. 7. As illustrated in FIG. 7, parent prefix "1.0.0.4/31" may serve as an aggregator for prefixes "1.0.0.4/32" and "1.0.0.5/32" to handle traffic directed to either of prefixes "1.0.0.4/32" and "1.0.0.5/32". Compression module 108 and/or installation module 110 may then merge prefixes "1.0.0.4/32" and "1.0.0.5/32" with parent prefix "1.0.0.4/31" by deleting prefixes "1.0.0.4/32" and "1.0.0.5/32" from table 120 upon installation of the parent prefix.

In another example, identification module 104 may walk tree structure 600 along another branch and/or identify prefixes "1.0.0.10/32" and "1.0.0.11/32" as sharing the 31 most-significant bits in common with one another. In this example, determination module 106 may determine that prefixes "1.0.0.10/32" and "1.0.0.11/32" are eligible for consolidation due at least in part to them sharing the 31 most-significant bits in common with one another. In response to this determination, installation module 110 may install a parent prefix "1.0.0.10/31" into tree structure 600 in FIG. 7. As illustrated in FIG. 7, parent prefix "1.0.0.10/31" may serve as an aggregator for prefixes "1.0.0.10/32" and "1.0.0.11/32" to handle traffic directed to either of prefixes "1.0.0.10/32" and "1.0.0.11/32". Compression module 108 and/or installation module 110 may then merge prefixes "1.0.0.10/32" and "1.0.0.11/32" with parent prefix "1.0.0.10/31" by deleting prefixes "1.0.0.10/32" and "1.0.0.11/32" from table 120 upon installation of the parent prefix.

Figure 8:
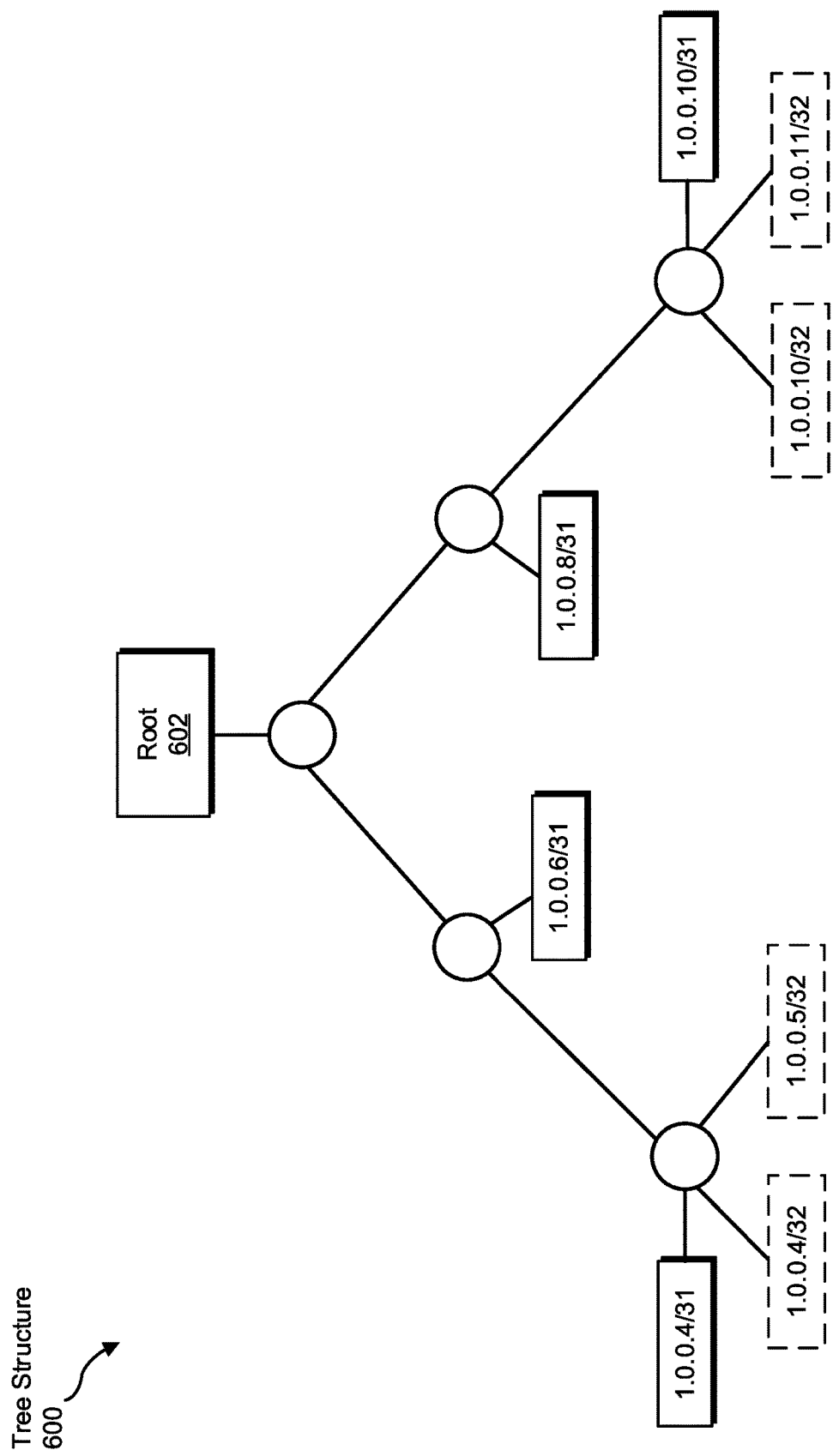
FIG. 8 is a block diagram of an additional exemplary tree structure in which a set of prefixes are organized on a network device.
Figure 9:
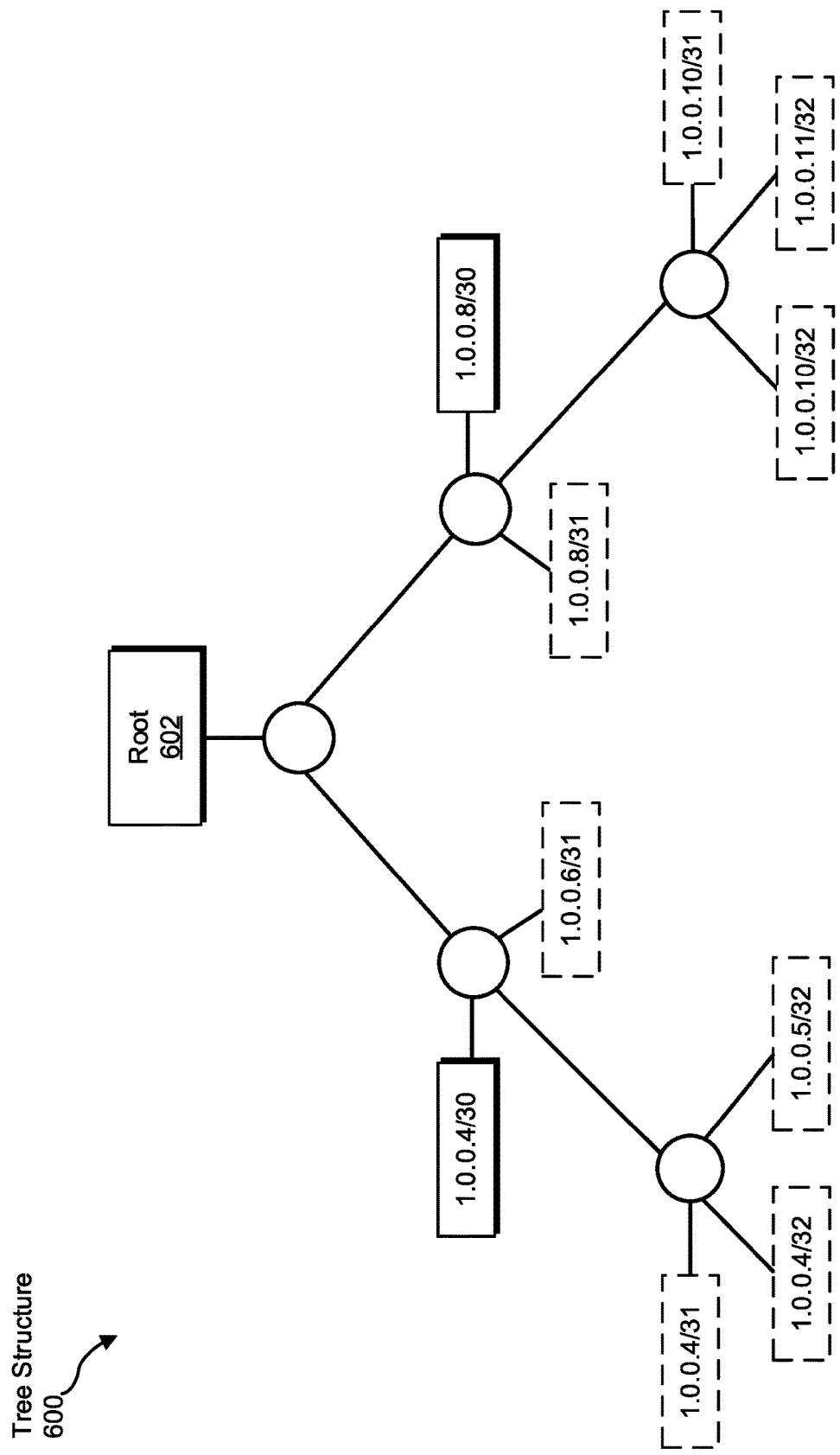
FIG. 9 is a block diagram of an additional exemplary tree structure in which a set of prefixes are organized on a network device.

As illustrated in FIG. 8, installation module 110 may subsequently install prefixes "1.0.0.6/31" and "1.0.0.8/31" above prefixes "1.0.0.4/31" and "1.0.0.10/31", respectively, toward root 602 in tree structure 600. In one example, identification module 104 may walk tree structure 600 along one branch and/or identify prefixes "1.0.0.4/31" and "1.0.0.6/31" as sharing the 30 most-significant bits in common with one another. In this example, determination module 106 may determine that prefixes "1.0.0.4/31" and "1.0.0.6/31" are eligible for consolidation due at least in part to them sharing the 30 most-significant bits in common with one another. In response to this determination, installation module 110 may devise and install an additional parent prefix "1.0.0.4/30" into tree structure 600 in FIG. 9. As illustrated in FIG. 9, additional parent prefix "1.0.0.4/30" may serve as an aggregator for prefixes "1.0.0.4/31" and "1.0.0.6/31" to handle traffic directed to any of prefixes "1.0.0.4/32", "1.0.0.5/32", "1.0.0.4/31", and "1.0.0.6/31". Compression module 108 and/or installation module 110 may then merge prefixes "1.0.0.4/31" and "1.0.0.6/31" with additional parent prefix "1.0.0.4/30" by deleting prefixes "1.0.0.4/31" and "1.0.0.6/31" from table 120 upon installation of the additional parent prefix.

In another example, identification module 104 may walk tree structure 600 along another branch and/or identify prefixes "1.0.0.8/31" and "1.0.0.10/31" as sharing the 30 most-significant bits in common with one another. In this example, determination module 106 may determine that prefixes "1.0.0.8/31" and "1.0.0.10/31" are eligible for consolidation due at least in part to them sharing the 30 most-significant bits in common with one another. In response to this determination, installation module 110 may devise and install an additional parent prefix "1.0.0.8/30" into tree structure 600 in FIG. 9. As illustrated in FIG. 9, additional parent prefix "1.0.0.8/30" may serve as an aggregator for prefixes "1.0.0.8/31" and "1.0.0.10/31" to handle traffic directed to any of prefixes "1.0.0.10/32", "1.0.0.11/32", "1.0.0.10/31", and "1.0.0.8/31". Compression module 108 and/or installation module 110 may then merge prefixes "1.0.0.10/31" and "1.0.0.8/31" with additional parent prefix "1.0.0.8/30" by deleting prefixes "1.0.0.10/31" and "1.0.0.8/31" from table 120 upon installation of the additional parent prefix.

FIG. 10 illustrates exemplary prefix information 1000 that identifies and/or enumerates the binary conversions, relationships, statuses, and next hops for the prefixes represented in tree structure 600 in FIGS. 6-9. As illustrated in FIG. 10, prefix information 1000 may indicate and/or show that prefix "1.0.0.4/30" is an installed parent whose binary conversion is "00000001.00000000.00000000.000001XX" and whose next hop is network device 212(1). In addition, prefix information 1000 may indicate and/or show that prefix "1.0.0.6/31" is an uninstalled child whose binary conversion is "00000001.00000000.00000000.0000011X" and whose next hop is network device 212(1). Moreover, prefix information 1000 may indicate and/or show that prefix "1.0.0.4/31" is an uninstalled child whose binary conversion is "00000001.00000000.00000000.0000010X" and whose next hop is network device 212(1). Prefix information 1000 may also indicate and/or show that prefix "1.0.0.4/32" is an uninstalled child whose binary conversion is "00000001.00000000.00000000.00000100" and whose next hop is network device 212(1). Additionally, prefix information 500 may indicate and/or show that prefix "1.0.0.5/32" is an uninstalled child whose binary conversion is "00000001.00000000.00000000.00000101" and whose next hop is network device 212(1).

As illustrated in FIG. 10, prefix information 1000 may further indicate and/or show that prefix "1.0.0.8/30" is an installed parent whose binary conversion is "00000001.00000000.00000000.000010XX" and whose next hop is network device 210(1). In addition, prefix information 1000 may indicate and/or show that prefix "1.0.0.8/31" is an uninstalled child whose binary conversion is "00000001.00000000.00000000.0000100X" and whose next hop is network device 210(1). Further, prefix information 1000 may indicate and/or show that prefix "1.0.0.10/31" is an uninstalled child whose binary conversion is "00000001.00000000.00000000.0000101X" and whose next hop is network device 210(1). Moreover, prefix information 1000 may indicate and/or show that prefix "1.0.0.10/32" is an uninstalled child whose binary conversion is "00000001.00000000.00000000.00001010" and whose next hop is network device 210(1). Finally, prefix information 1000 may indicate and/or show that prefix "1.0.0.11/32" is an uninstalled child whose binary conversion is "00000001.00000000.00000000.00001011" and whose next hop is network device 210(1).

In some examples, compression module 108 may limit and/or mitigate route churns by applying a distance limit that prevents consolidations and/or mergers of any parent and child prefixes separated from one another beyond a certain distance. In one example, identification module 104 may identify a child prefix that corresponds to a parent prefix within table 120. In this example, determination module 106 may determine that the parent prefix and the child prefix share a certain number of most-significant bits in common with one another. In addition, determination module 106 may determine that the parent prefix and the child prefix share a certain forwarding behavior in common with one another. However, determination module 106 may also determine that the parent prefix and the child prefix are separated from one another by the certain distance or more.

In response to the determination that the parent prefix and the child prefix are separated from one another by the certain distance or more, compression module 108 and/or installation module 110 may refuse to merge the child prefix with the parent prefix even though the parent prefix and the child prefix share the certain number of most-significant bits and the certain forwarding behavior in common within one another. By applying the distance limit in this way, compression module 108 and/or installation module 110 may ensure that a single route change does not cause and/or trigger an excessive number of hardware or memory writes in connection with table compression and/or prefix mergers.

Figure 12:
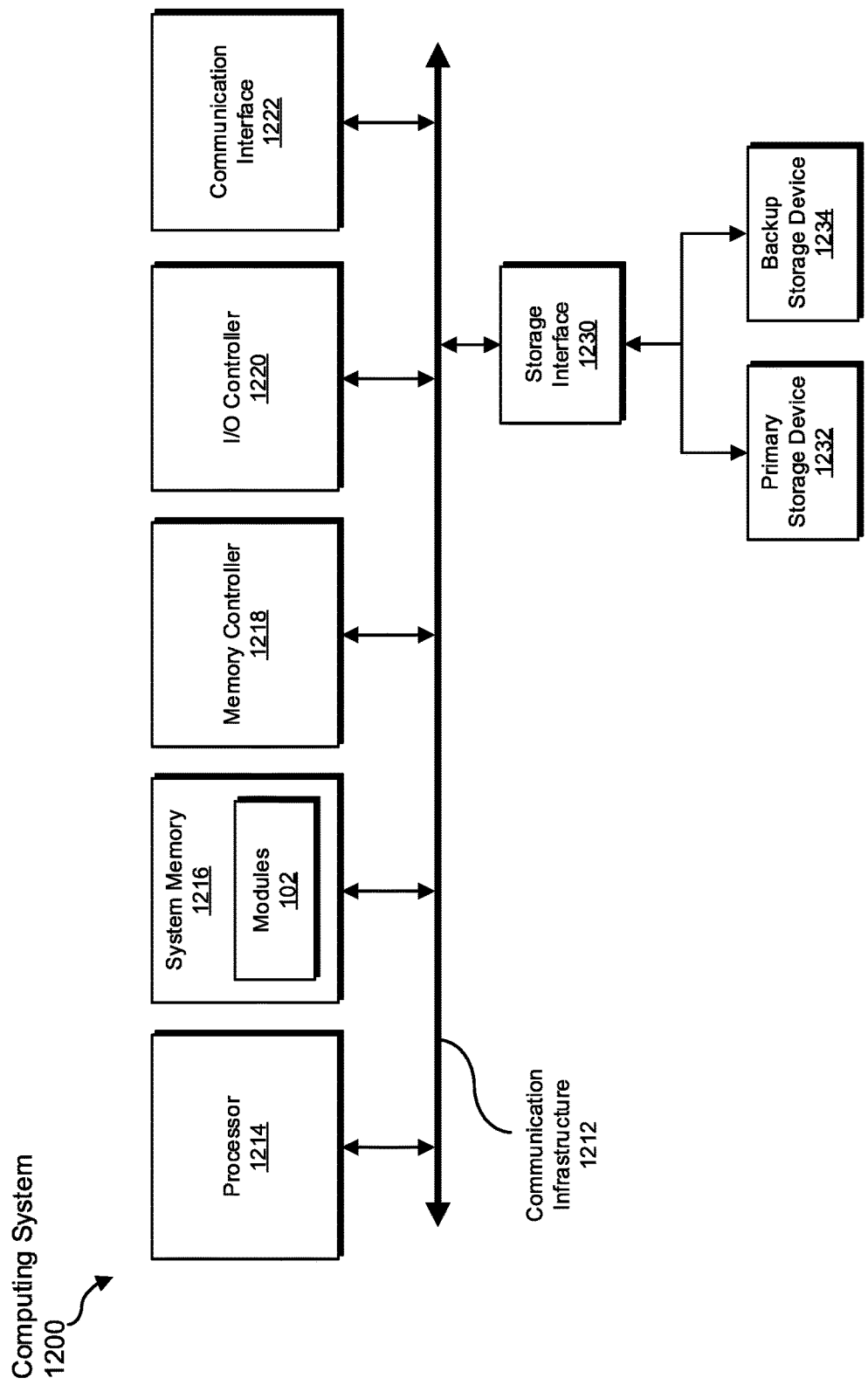
FIG. 12 is a block diagram of an exemplary computing system capable of implementing and/or being used in connection with one or more of the embodiments described and/or illustrated herein.

FIG. 12 is a block diagram of an exemplary computing system 1200 capable of implementing and/or being used in connection with one or more of the embodiments described and/or illustrated herein. In some embodiments, all or a portion of computing system 1200 may perform and/or be a means for performing, either alone or in combination with other elements, one or more of the steps described in connection with FIG. 3. All or a portion of computing system 1200 may also perform and/or be a means for performing and/or implementing any other steps, methods, or processes described and/or illustrated herein.

Computing system 1200 broadly represents any type or form of electrical load, including a single or multi-processor computing device or system capable of executing computer-readable instructions. Examples of computing system 1200 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1200 may be programmed, configured, and/or otherwise designed to comply with one or more networking protocols. According to certain embodiments, computing system 1200 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1200 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1200 may include various network and/or computing components. For example, computing system 1200 may include at least one processor 1214 and a system memory 1216. Processor 1214 generally represents any type or form of processing unit capable of processing data or interpreting and executing instructions. For example, processor 1214 may represent an ASIC, a system on a chip (e.g., a network processor), a hardware accelerator, a general purpose processor, and/or any other suitable processing element.

Processor 1214 may process data according to one or more of the networking protocols discussed above. For example, processor 1214 may execute or implement a portion of a protocol stack, may process packets, may perform memory operations (e.g., queuing packets for later processing), may execute end-user applications, and/or may perform any other processing tasks.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1200 may include both a volatile memory unit (such as, for example, system memory 1216) and a non-volatile storage device (such as, for example, primary storage device 1232, as described in detail below). System memory 1216 may be implemented as shared memory and/or distributed memory in a network device. Furthermore, system memory 1216 may store packets and/or other information used in networking operations.

In certain embodiments, exemplary computing system 1200 may also include one or more components or elements in addition to processor 1214 and system memory 1216. For example, as illustrated in FIG. 12, computing system 1200 may include a memory controller 1218, an Input/Output (I/O) controller 1220, and a communication interface 1222, each of which may be interconnected via communication infrastructure 1212. Communication infrastructure 1212 generally represents any type or form of infrastructure capable of facilitating communication between one or more components of a computing device. Examples of communication infrastructure 1212 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1218 generally represents any type or form of device capable of handling memory or data or controlling communication between one or more components of computing system 1200. For example, in certain embodiments memory controller 1218 may control communication between processor 1214, system memory 1216, and I/O controller 1220 via communication infrastructure 1212. In some embodiments, memory controller 1218 may include a Direct Memory Access (DMA) unit that may transfer data (e.g., packets) to or from a link adapter.

I/O controller 1220 generally represents any type or form of device or module capable of coordinating and/or controlling the input and output functions of a computing device. For example, in certain embodiments I/O controller 1220 may control or facilitate transfer of data between one or more elements of computing system 1200, such as processor 1214, system memory 1216, communication interface 1222, and storage interface 1230.

Communication interface 1222 broadly represents any type or form of communication device or adapter capable of facilitating communication between exemplary computing system 1200 and one or more additional devices. For example, in certain embodiments communication interface 1222 may facilitate communication between computing system 1200 and a private or public network including additional computing systems. Examples of communication interface 1222 include, without limitation, a link adapter, a wired network interface (such as a network interface card), a wireless network interface (such as a wireless network interface card), and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1222 may also represent a host adapter configured to facilitate communication between computing system 1200 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also enable computing system 1200 to engage in distributed or remote computing. For example, communication interface 1222 may receive instructions from a remote device or send instructions to a remote device for execution.

As illustrated in FIG. 12, exemplary computing system 1200 may also include a primary storage device 1232 and/or a backup storage device 1234 coupled to communication infrastructure 1212 via a storage interface 1230. Storage devices 1232 and 1234 generally represent any type or form of storage device or medium capable of storing data and/or other computer-readable instructions. For example, storage devices 1232 and 1234 may represent a magnetic disk drive (e.g., a so-called hard drive), a solid state drive, a floppy disk drive, a magnetic tape drive, an optical disk drive, a flash drive, or the like. Storage interface 1230 generally represents any type or form of interface or device for transferring data between storage devices 1232 and 1234 and other components of computing system 1200.

In certain embodiments, storage devices 1232 and 1234 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1234 may also include other similar structures or devices for allowing computer software, data, or other computer-readable instructions to be loaded into computing system 1200. For example, storage devices 1232 and 1234 may be configured to read and write software, data, or other computer-readable information. Storage devices 1232 and 1234 may be a part of computing system 1200 or may be separate devices accessed through other interface systems.

Many other devices or subsystems may be connected to computing system 1200. Conversely, all of the components and devices illustrated in FIG. 12 need not be present to practice the embodiments described and/or illustrated herein. The devices and subsystems referenced above may also be interconnected in different ways from those shown in FIG. 12. Computing system 1200 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
  identifying a set of prefixes that:
    facilitate forwarding traffic within a network; and
    are organized as a tree data structure in connection with a table stored on a network device;
  applying a distance limit, that prevents mergers of any parent and child prefixes separated from one another by at least, a certain distance in the set of prefixes;
  identifying, in the set of prefixes, a parent prefix and a child prefix that corresponds to the parent prefix;
  determining that the parent prefix and the child prefix share a certain number of most-significant bits in common with one another;

determining that the parent prefix and the child prefix share a forwarding behavior in common with one another;

determining that the parent prefix and the child prefix are separated from one another by at least the certain distance; and in response to determining that the parent prefix and the child prefix are separated from one another by at least the certain distance, refusing to merge the child prefix with the parent prefix within the table even though the parent prefix and the child prefix share the certain number of most-significant bits and the forwarding behavior in common.

2. The method of claim 1, wherein the table comprises at least one of:

a routing information base of the network device; and a forwarding information base of the network device.

3. The method of claim 1, wherein identifying the parent prefix and the child prefix comprises:

implementing a table-compression application that simulates the table stored on the network device; and determining, based at least in part on the simulation of the table stored on the network device, that the parent prefix and the child prefix share the certain number of most-significant bits and the forwarding behavior in common.

4. The method of claim 3, further comprising installing a copy of the set of prefixes in the table stored on the network device; and wherein identifying the set of prefixes organized as the tree data structure comprises maintaining the set of prefixes via the table-compression application that simulates the table stored on the network device.

5. The method of claim 4, further comprising:

detecting a route change to be performed on the copy of the set of prefixes installed in the table stored on the network device; and propagating the route change to the set of prefixes maintained via the table-compression application that simulates the table stored on the network device.

6. The method of claim 3, wherein implementing the table-compression application comprises executing the table-compression application via at least one of:

a packet forwarding engine; and a routing engine.

7. The method of claim 1, wherein determining that the parent prefix and the child prefix share the forwarding behavior in common comprises:

identifying a next hop that corresponds to the child prefix; and determining that the next hop also corresponds to the parent prefix.

8. The method of claim 1, wherein refusing to merge the child prefix with the parent prefix within the table comprises at least one of:

installing the child prefix in the table stored on the network device; and maintaining the child prefix in the table.

9. The method of claim 1, further comprising:

identifying, in the set of prefixes organized as the tree data structure, an additional child prefix that corresponds to the parent prefix;

identifying a characteristic shared by the child prefix and the additional child prefix;

determining that the child prefix and the additional child prefix are eligible for consolidation due at least in part to the characteristic being shared by the child prefix and the additional child prefix; and in response to determining that the child prefix and the additional child prefix are eligible for consolidation, compressing the table by merging the child prefix and the additional child prefix.

10. The method of claim 9, further comprising refusing to merge the child prefix and the additional child prefix with the parent prefix due at least in part to the parent prefix and the child prefix being separated from one another by at least the certain distance.

11. The method of claim 9, further comprising:

identifying, in the set of prefixes organized as the tree data structure, a further child prefix that corresponds to the parent prefix;

identifying an additional characteristic shared by the parent prefix and the further child prefix;

determining that the parent prefix and the further child prefix are eligible for consolidation due at least in part to the additional characteristic being shared by the parent prefix and the further child prefix; and in response to determining that the parent prefix and the further child prefix are eligible for consolidation, installing an additional parent prefix in the table as an additional aggregator to handle traffic directed to the parent prefix or the further child prefix.

12. The method of claim 1, wherein the tree data structure comprises a radix tree stored in a forwarding information base of the network device.

13. A system comprising:

an identification module, stored in memory, that identifies a set of prefixes that:

facilitate forwarding traffic within a network; and are organized as a tree data structure in connection with a table stored on a network device;

a compression module, stored in memory, that applies a distance limit that prevents mergers of any parent and child prefixes separated from one another by at least a certain distance in the set of prefixes;

wherein the identification module further identifies, in the set of prefixes, a parent prefix and a child prefix that corresponds to the parent prefix;

a determination module, stored in memory, that:

determines that the parent prefix and the child prefix share a certain number of most-significant bits in common with one another;

determines that the parent prefix and the child prefix share a forwarding behavior in common with one another; and determines that the parent prefix and the child prefix are separated from one another by at least the certain distance;

a compression module, stored in memory, that refuses to merge the child prefix with the parent prefix within the table in response to determining that the parent prefix and the child prefix are separated from one another by at least the certain distance even though the parent prefix and the child prefix share the certain number of most-significant bits and the forwarding behavior in common; and at least one physical processor configured to execute the identification module, the determination module, and the compression module.

14. The system of claim 13, wherein the table comprises at least one of:
- a routing information base of the network device; and
- a forwarding information base of the network device.

15. The system of claim 13, wherein the compression module:
- simulates the table stored on the network device; and
- determines, based at least in part on the simulation of the table stored on the network device, that the parent prefix and the child prefix share the certain number of most-significant bits and the forwarding behavior in common.

16. The system of claim 15, further comprising an installation module, stored in memory, that installs a copy of the set of prefixes in the table stored on the network device; and
- wherein the compression module maintains the set of prefixes to simulate the table stored on the network device.

17. The system of claim 16, further comprising a detection module, stored in memory, that detects a route change to be performed on the copy of the set of prefixes installed in the table stored on the network device; and
- wherein the installation module propagates the route change to the set of prefixes maintained to simulate the table stored on the network device.

18. The system of claim 15, wherein the physical processor comprises at least one of:
- a packet forwarding engine that executes the compression module; and
- a routing engine that executes the compression module.

19. An apparatus comprises:
- at least one storage device that stores a set of prefixes that:
  - facilitate forwarding traffic within a network; and
  - are organized as a tree data structure in connection with a table stored on a network device; and
- at least one physical processor communicatively coupled to the storage device, wherein the physical processor:
  - applies a distance limit that prevents mergers of any parent and child prefixes separated from one another by at least a certain distance in the set of prefixes;
  - identifies, in the set of prefixes, a parent prefix and a child prefix that corresponds to the parents prefix;
- determines that the parent prefix and the child prefix share a certain number of most-significant bits in common with one another;
- determines that the parent prefix and the child prefix share a forwarding behavior in common with one another;
- determines that the parent prefix and the child prefix are separated from one another by at least the certain distance; and
- in response to determining that the parent prefix and the child prefix are separated from one another by at least the certain distance, refuses to merge the child prefix with the parent prefix within the table even though the parent prefix and the child prefix share the certain number of most-significant bits and the forwarding behavior in common.

* * * * *